April 2, 1957 H. A. SCHLATTER ET AL 2,787,698
FLASH WELDING MACHINES
Filed June 10, 1954 2 Sheets-Sheet 1

INVENTORS:
HANS ALFRED SCHLATTER
AND EMIL WEGMANN
BY

April 2, 1957   H. A. SCHLATTER ET AL   2,787,698
FLASH WELDING MACHINES
Filed June 10, 1954   2 Sheets-Sheet 2

INVENTORS:
HANS ALFRED SCHLATTER
AND EMIL WEGMANN
BY

United States Patent Office 2,787,698
Patented Apr. 2, 1957

2,787,698

FLASH WELDING MACHINES

Hans Alfred Schlatter and Emil Wegmann, Zollikon-Zurich, Switzerland, assignors to Firma H. A. Schlatter A. G., Zollikon-Zurich, Switzerland Application June 10, 1954, Serial No. 435,843

Claims priority, application Switzerland December 30, 1953

5 Claims. (Cl. 219—101)

The present invention relates to welding machines, and in particular to flash welding machines.

As is well known, in flash welding machines the parts to be welded are repeatedly brought together and separated with current flowing therethrough to create a flash when the parts are slightly separated, this flash producing the greatest part of the heat which renders the metal at the joint molten, the balance of the heat coming from the resistance at the joint. When the metal at the joint is molten heavy pressure is quickly applied pushing the parts together to force out the molten metal and make the weld in the plastic metal just in back of the molten metal. The flash and upset at the welded joint must then be removed.

In known machines which flash weld elongated members, such as the rails of railroad tracks, to each other, it is a fairly difficult matter to accurately position the elongated members with respect to each other for the welding process. Also, the electrical contacts which engage the members to be welded sometimes disturb the position of these members. Furthermore, the removal of the flash and upset after the welding requires a considerable amount of time and is extremely inconvenient.

One of the objects of the present invention is to provide a means which will guarantee accurate location of the members to be welded.

Another object of the present invention is to provide a means for adjusting the position in which the articles to be welded are located.

A further object of the present invention is to provide a simple and ruggedly constructed means for locating the articles to be welded on the welding machine.

An additional object of the present invention is to provide electrical contacts which will engage the members to be welded but which are incapable of disturbing the position thereof.

Still another object of the present invention is to provide a means which will remove flash and upset from the welded joint simultaneously with removal of the welded articles from the welding machine.

With the above objects in view, the present invention mainly consists of a flash welding machine which includes, in combination, a support for an article to be welded, and a stop member having a work-engaging face and being carried by the support for movement to and from an operating position where the face of the stop member is adapted to engage a surface of an article to be welded. A pressure member is carried by the support opposite the work-engaging face of the stop member and away from this face so that the pressure member, upon movement toward the work-engaging face of the stop member engages the article to be welded and presses the same against the work-engaging face of the stop member. A fluid pressure means is operatively connected to the stop and pressure members for moving the stop member toward this operating position and for moving the pressure member toward the work-engaging face of the stop member, and this fluid pressure means applies to the stop member a force greater than that applied to that of the pressure member so that the latter is incapable of moving an article beyond a position where the article engages the work-engaging face of the stop member. A pair of electrically conductive contact members are carried by the support means for movement toward each other to an operating position where the contact members engage opposite faces of an article to be welded, and a fluid pressure means is connected to the contact members for moving the same toward each other and for applying equal forces thereto so that when these contact members engage an article to be welded, the position of the latter cannot be disturbed by the contact member. A carrier means is fixed to the support along the part thereof where the article to be welded is adapted to be located and has a side face directed toward the area of the welding machine where the welding takes place, and a cutting means is mounted on this side face of the carrier means for cutting a flash and upset from the work after the latter is welded and during movement thereof with respect to the carrier means.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a partly sectional, partly schematic, side elevational view of a welding machine constructed in accordance with the present invention, the plane of Fig. 1 being taken horizontally and substantially centrally through the structure illustrated in Fig. 2;

Fig. 2 has a view taken along line 2—2 of Fig. 1 in the direction of the arrows;

Figure 1:
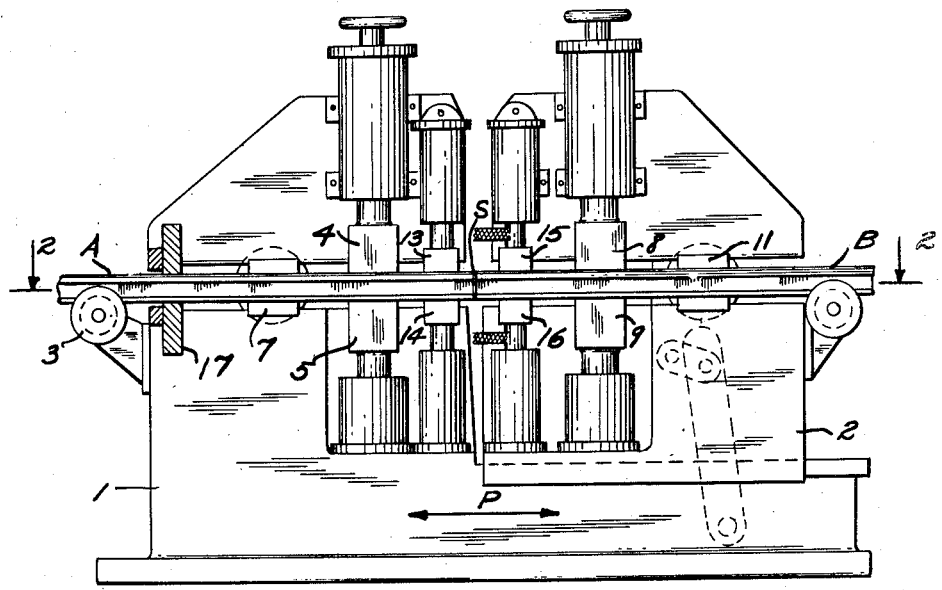
Figure 2:
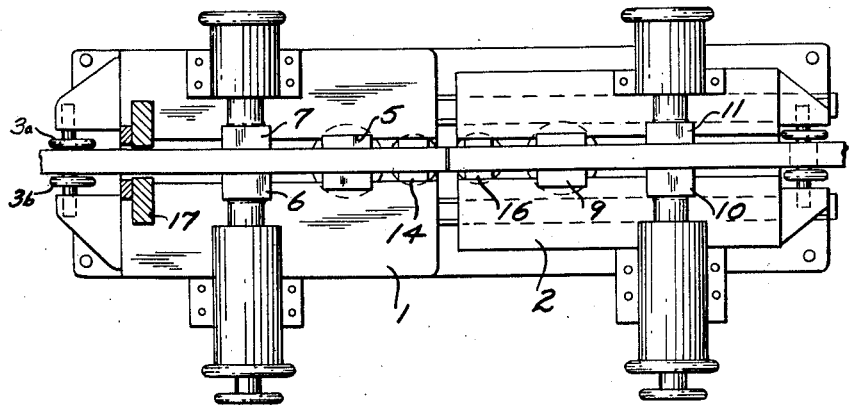

Referring now to the drawings, and to Figs. 1 and 2 in particular, it will be seen that the welding machine of the invention includes a massive base 1 which carries a carriage 2 for reciprocating movement in the direction of arrows P of Fig. 1. By way of example only, a pair of railroad rails A and B are shown in the machine. The left rail A of Fig. 1 is guided into the machine by a guide roller 3 turnably mounted on the base 1 and having a pair of outer guide flanges 3a and 3b to guide the rail A as it is moved into the machine from the left toward the right, the rail A being clamped between a pair of members 4 and 5, on the one hand, and a pair of members 6 and 7, on the other hand, the structure for moving these members being mounted on the base 1. It will be noted that the members 4 and 5 are vertically arranged whereas the members 6 and 7 are horizontally arranged so that these members act along perpendicular lines, respectively. The right rail B is moved into the machine from the right, as viewed in Figs. 1 and 2, and is guided by a roller identical with roller 3 and carried by the carriage 2. The rail B is clamped between the pair of members 8 and 9, on the one hand, and the pair of members 10 and 11, on the other hand, the structure for moving these members being carried by the carriage 2. A lever, shown in dotted lines in the lower right portion of Fig. 1, is connected to the carriage 2 for reciprocating the same, this lever being turned in a known way by a piston which is unillustrated since it forms no part of the present invention. The carriage 2 is reciprocated together with the rail B during the welding process with respect to the stationary rail A.

In addition to the above-described structure for fixing the positions of the rails on the machine, there is provided for each rail a pair of contacts for guiding current to the rails, the pair of contacts 13 and 14 being associated with the rail A, and the pair of contacts 15 and 16 being associated with the rail B. Each pair of contacts 13, 14 and 15, 16 are urged toward each other with the same pressure and therefore engage the rail located therebetween with the same pressure at opposite faces of the rail.

Figures 3, 4, 5:
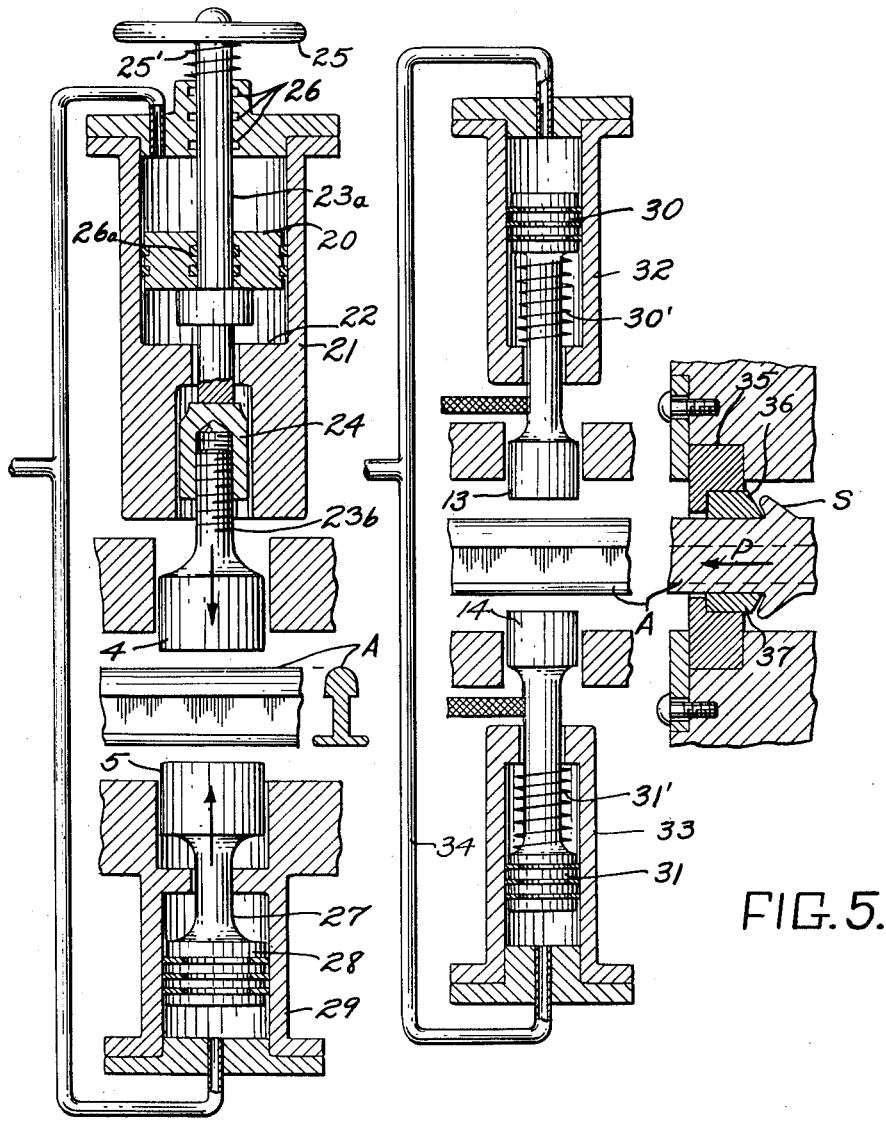
Fig. 3 is a fragmentary, partly sectional, diagrammatic view of part of the structure for clamping an article to be welded in position on the welding machine.
Fig. 4 is partly sectional partly schematic fragmentary view of a pair of contact members and means for moving the same.
Fig. 5 is a fragmentary central sectional view through a means mounted on the welding machine for removing flash and upset from the welded article.

Furthermore, there is located between the left roller 3 and the members 4, 5 a means for removing flash and upset, this means being generally indicated with the numeral 17 in Fig. 1 and being shown in detail in Fig. 5. This means 17 can be located nearer to the welded joint; for example, between the members 4, 5 and 13, 14.

It will be noted that the members 8, 9, act along a line perpendicular to the line along which the members 10, 11 act, in the same way as was described above with respect to members 4—7, so that each rail has its position determined vertically as well as horizontally. If desired, one of the pairs of clamping members may simultaneously serve to conduct current to the members to be welded, but in the example illustrated separate contacts 13—16 are provided for this purpose.

The above described pairs of members are each individually controllable so that the pairs of members can be actuated in any desired sequence. The contact members 13—16, however, are always brought into engagement with the rails after their position is determined by the clamping members 4—7 and 8—11.

Except for minor differences discussed below, each pair of members is actuated with the same structure, and therefore this structure will be described only in connection with the members 4 and 5, it being understood that the structure shown in Fig. 3 is also associated with the remaining pairs of members and is arranged vertically with respect to members 4, 5 and 8, 9 and horizontally with respect to members 6, 7 and 10, 11. The structures associated with the even numbered members 4, 6, 8 and 10 are identical and the structures associated with the odd numbered members 5, 7, 9, and 11 are also identical, except for a few minor differences pointed out below. The even numbered members act as stop members to determine the position of the rails and the odd numbered members act as pressure members to press the rails against the stop members and between the latter and the pressure members. The several pressure and stop members are hydraulically or pneumatically actuated, preferably with the same fluid medium derived from a common source.

Referring now to Fig. 3, the stop member 4 is of a non-circular cross section and guided in a mating non-circular opening of the machine so that the stop member 4 can move toward and away from the pressure member 5 but cannot turn. The stop member 4 is moved through the agency of a fluid pressure medium which acts against the piston 20 within the cylinder 21 to which any suitable fluid medium is supplied through the lines shown in Fig. 3. As is apparent from Fig. 3 the cylinder 21 is provided with an end wall 22 whose inner face is adapted to engage a collar fixed to the rod 23a which extends slidably through the piston 20. This piston 20 is provided with outer sealing rings as well as inner sealing rings 26a which engage the rod 23a. Thus, when pressure is applied to the top face of piston 20, as viewed in Fig. 3, the piston will engage the collar on rod 23a to move the latter and the stop member 4 therewith downwardly until the collar on rod 23a engages end wall 22 of cylinder 21 so that the position of the stop member 4 is determined in this way, and this predetermined location of stop member 4 also determines the position of the work piece A. The rod 23a extends through an opening in the top wall of the cylinder 21 and through additional sealing rings 26 located in this opening to the exterior of the cylinder where a handle 25 is fixed to the rod 23a so that the latter may be manually turned about its axis. An elongated threaded member 24 is fixed to the bottom end of rod 23a, this member 24 being in the form of an internally threaded sleeve which is in threaded engagement with an elongated extension 23b fixed to and integral with the stop member 4. Since the latter cannot turn, turning of hand wheel 25 will cause the extension 23b to be moved into or out of the sleeve 24, and in this way the combined length of rod 23a and extension 23b may be adjusted to determine the location of stop member 4 when the end wall 22 of cylinder 21 is engaged by the collar which is fixed to the rod 23a. A coil spring 25' is located about rod 23a between the top wall of cylinder 21 and the handle 25 to urge the stop member 4 upwardly after pressure is removed from the interior of the cylinder 21.

A pressure member 5 is guided through an opening in the structure which carries the cylinder 29, this pressure member 5 being fixed to the piston rod 27 which extends through an end wall of cylinder 29 and is fixed to the piston 28 located within the cylinder 29, the latter being provided with fluid pressure from the same line as the cylinder 21, as is illustrated in Fig. 3. The diameter of piston 28, and therefore of cylinder 29, is at least 10% smaller than the diameter of piston 20, and therefore of cylinder 21, so that a greater pressure force is applied to the stop member 4 than the pressure member 5, and thus, the latter can never apply to the rail and the stop member 4 a force great enough to raise the collar of rod 23a above the end wall 22 of cylinder 21, this end wall forming a stop means which determines the location of stop member 4, as was mentioned above.

Since pressure member 5 is vertically located beneath stop member 4, when the fluid pressure is released this pressure member 5 as well as rod 27 and piston 28 will move downwardly away from the rail by gravity, and the spring 25' will urge the stop member 4 upwardly, in the manner described above. The same is true of the stop member 8 and pressure member 9. However, in the case of stop members 6 and 10 and pressure members 7 and 11, which are arranged horizontally, in addition to springs 25' associated with the stop members 6 and 10, an additional pair of springs are associated with the pressure members 7 and 11 to move the latter away from the rails A and B, respectively, when the fluid pressure is released, these latter springs being, for example, located about the piston rod 27 between the piston 28 and the end wall of the cylinder 29 nearest to the rail.

Fig. 4 of the drawings illustrates the fluid pressure means operatively connected to the contacts 13 and 14 for moving the same toward and away from the rail A, the same structure being associated with the contacts 15 and 16 for operating the latter. This structure includes the pistons 30 and 31 connected through suitable piston rods with the contact members 13 and 14, respectively, and sliding within the cylinders 32 and 33, respectively, which are mounted on the machine in any suitable way. These cylinders are supplied with fluid pressure from a common line 34 which interconnects these cylinders so that there is always the same pressure within the cylinders 32 and 33, and moreover these cylinders are of the same diameter. Thus, the contacts 13 and 14 will apply the same pressure to opposite faces of the rail A and will be incapable of moving the latter from the position determined by members 4–7. The contacts 13 and 14 are, of course, insulated from the rest of the machine in any suitable way. For example, the cylinders 32 and 33 are insulated from the frame of the machine and also the parts of the machine which guide the contacts 13 and 14 are insulated from the rest of the machine. Springs 30' and 31' of equal force are provided, in the manner shown in Fig. 4, to urge the members 13 and 14 away from each other when the fluid pressure in the cylinders 32 and 33 is released.

Fig. 5 of the drawings illustrates the construction of the means for removing the flash and upset from the welded joint. This means takes the form of a carrier member 35 fixed to the machine and formed with an opening through which the rail A extends. Above and below this opening there are fixed to the carrier member 35 a pair of cutting blades 36 and 37 directed toward the welded joint S and forming a cutting means for removing flash and upset from this joint. When the welded rails with the still glowing joint S is moved in the direction of arrow P of Fig. 5 from the machine, the flash and upset at the top and bottom of the joint are automatically removed with the blades 36 and 37. With railroad rails it is unnecessary to remove the flash and upset at the sides of the rails. However, if desired the same carrier 35 can be provided with additional cutting members to remove the flash and upset at the side of the joint or a second cutting means as shown in Fig. 5 may be provided next to the cutting means shown in Fig. 5 for this purpose.

It will be understood that each of the elements described above, or two or more together, may also find a useful application in other types of welding machines differing from the types described above.

While the invention has been illustrated and described as embodied in flash welding machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a flash welding machine, in combination, a support for an article to be welded; a stop member having a work-engaging face and being carried by said support for movement to and from an operating position where said face of said stop member is adapted to engage a surface of an article to be welded; a pressure member carried by said support opposite said work-engaging face of said stop member for movement toward and away from said face, so that said pressure member, upon movement toward said face, engages an article to be welded located against said work-engaging face and presses the article against said face, so that said stop member determines the position of the work on the welding machine; fluid pressure means operatively connected to said stop member and said pressure member for moving said stop member toward said operating position and said pressure member toward said work-engaging face of said stop member and for applying to said stop member a force greater than that applied to said pressure member so that the latter is incapable of moving an article beyond a position where the article engages said work-engaging face of said stop member and stop means engaging said stop member during movement thereof toward said operating position for limiting the movement of said stop member toward said operating position and thereby determining said operating position of said stop member.

2. In a flash welding machine, in combination, a support for an article to be welded; a pair of stop members respectively having work-engaging faces and being carried by said support for movement along substantially perpendicular paths, respectively, to and from operating positions, respectively, where said work-engaging faces of said stop members are adapted to engage a surface of an article to be welded; a pair of pressure members carried by said support respectively opposite said work-engaging faces of stop members for movement respectively along substantially perpendicular paths toward and away from said faces, respectively, so that said pressure members, upon movement toward said faces, respectively, engage an article located against said faces and press the article against said faces so that said stop members determine the position of the work on the welding machine; fluid pressure means operatively connected to each stop member and the pressure member located opposite the same for moving said stop members respectively toward said operating positions and said pressure members respectively toward said work-engaging faces of said stop members and for applying to said stop members a force greater than that applied to said pressure members so that the latter are incapable of moving an article beyond a position where the article engages said work-engaging faces of said stop members and a pair of stop means respectively engaging said pair of stop members during movement thereof toward said operating positions, respectively, for limiting the movement of said stop members toward said operating positions, respectively, and thereby determining said operating positions of said stop members, respectively.

3. In a flash welding machine, in combination, a support for an article to be welded; a stop member having a work-engaging face and being carried by said support for movement to and from an operating position where said face of said stop member is adapted to engage a surface of an article to be welded; a pressure member carried by said support opposite said work-engaging face of said stop member for movement toward and away from said face, so that said pressure member, upon movement toward said face, engages an article to be welded located against said work-engaging face and presses the article against said face, so that said stop member determines the position of the work on the welding machine; a pair of electrically conductive contact members carried by said support means for movement toward each other to an operating position where said contact members engage opposite faces of an article to be welded; fluid pressure means operatively connected to said contact members for moving the same toward each other and for applying equal forces thereto so that when said contact members engage an article to be welded the position of the latter cannot be disturbed by said contact members; and fluid pressure means operatively connected to said stop member and said pressure member for moving said stop member toward said operating position and said pressure member toward said work-engaging face of said stop member and for applying to said stop member a force greater than that applied to said pressure member so that the latter is incapable of moving an article beyond a position where the article engages said work-engaging face of said stop member.

4. In a flash welding machine, in combination, support means; a pair of cylinders carried by said support means in spaced and coaxial relation to each other, one of said cylinders having a diameter greater than the other of said cylinders; a pair of piston means respectively mounted in said cylinders; fluid pressure means communicating with the interior of said cylinders for urging said pair of piston means toward each other; stop means for limiting the movement of the piston means in the larger of said cylinders toward the other of said piston means; a pressure member connected to said other piston means to be moved thereby and located adjacent the end of the smaller of said cylinders nearest to said larger cylinder; and a stop member connected to the piston means in the larger of said cylinders to be moved thereby and located adjacent the end of said larger cylinder nearest said smaller cylinder, whereby with equal unit fluid pressures in said cylinders a greater force is applied to said stop member than said pressure member so that the position of said stop member is determined by said stop means and so that said pressure member is adapted to press a work piece against said stop member.

5. In a flash welding machine, in combination, support means; a pair of cylinders carried by said support means in spaced and coaxial relation to each other, one of said cylinders having a diameter greater than the other of said cylinders, said cylinders respectively having end walls directed toward each other; a pair of rods respectively extending through said end walls into the interior of said cylinders; a piston fixed to the rod in the smaller of said cylinders and being slidable within the latter; a collar fixed to the rod in the larger of said cylinders and being located within the latter; a piston in the larger of said cylinders formed with an opening through which said rod in said larger cylinder extends and being located further from said end wall of said larger cylinder than said collar; fluid pressure means communicating with the interior of said cylinders for urging said pistons toward each other, said collar engaging said end wall of the larger of said cylinders to limit movement of the rod therein toward the smaller of said cylinders; an elongated threaded member fixed to the end of the rod of the larger cylinder nearest said smaller cylinder and located between said end walls; a stop member threadedly connected to said elongated member and located between the latter and the smaller of said cylinders, said stop member having a portion of non-circular cross section; guide means for guiding said portion of non-circular cross section of said stop member for movement toward and away from said smaller cylinder and for preventing rotation of said portion of non-circular cross section; means connected to said rod of said larger cylinder for turning the same so as to turn said elongated threaded member with respect to said stop member to adjust the combined length of said stop member, elongated threaded member, and rod connected thereto; and a pressure member fixed to the end of the rod of the smaller cylinder nearest said stop member, whereby a work piece may be clamped between said stop and pressure members and will have its position determined by said stop member.

References Cited in the file of this patent
UNITED STATES PATENTS

| | | |
|---|---|---|
| 1,832,719 | McBerty | Nov. 17, 1931 |
| 2,272,737 | Chapman | Feb. 10, 1942 |
| 2,297,893 | Jones | Oct. 6, 1942 |
| 2,302,420 | Chapman | Nov. 17, 1942 |